Sept. 4, 1934.　　　　F. J. DONOVAN　　　　1,972,552
VACUUM OPERATED JACK
Filed Dec. 16, 1931　　2 Sheets-Sheet 1
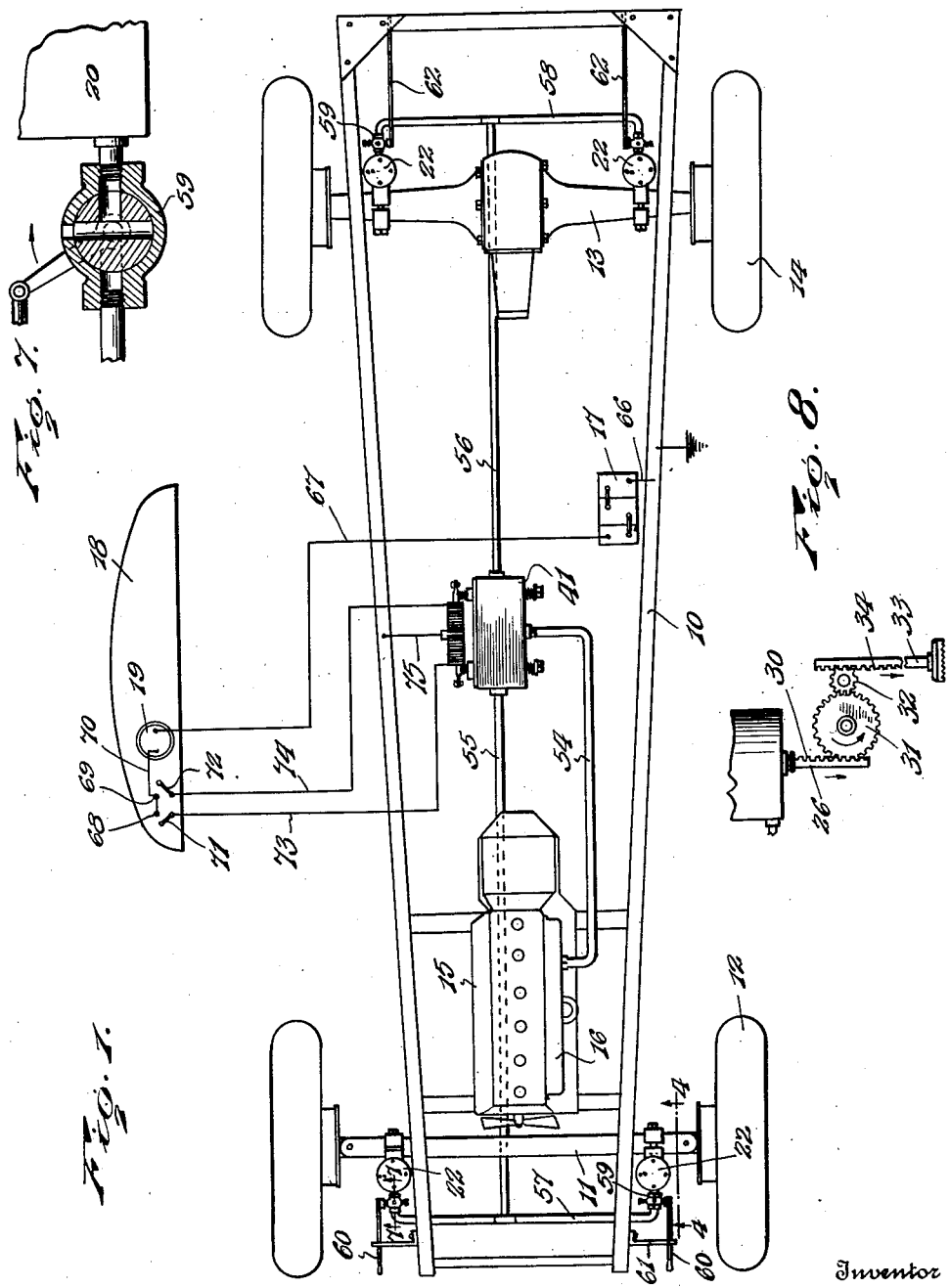

Sept. 4, 1934.   F. J. DONOVAN   1,972,552
VACUUM OPERATED JACK
Filed Dec. 16, 1931   2 Sheets-Sheet 2

Inventor
F. J. Donovan.

Patented Sept. 4, 1934

1,972,552

UNITED STATES PATENT OFFICE 1,972,552

VACUUM OPERATED JACK

Francis J. Donovan, New York, N. Y., assignor of one-half to Ralph S. Kayser, New York, N. Y.

Application December 16, 1931, Serial No. 581,450

8 Claims. (Cl. 254—93)

This invention relates to an improved vacuum operated jack for motor vehicles and seeks, among other objects, to provide a mechanism wherein the vacuum produced by the intake of the vehicle engine, when the engine is in operation, will be feasibly employed for jacking up the wheels of the vehicle.

The invention seeks, as a further object, to provide a mechanism of such simple nature and sufficient lightness in weight that said mechanism may be permanently mounted upon the vehicle so as to always be in position for use.

Another object of the invention is to provide a mechanism which may be electrically controlled from the vehicle instrument board to effect the raising of either both front wheels or both rear wheels, as may be desired, or all four wheels simultaneously.

A further object, in the foregoing connection, is to provide means whereby the jack units may be locked for supporting the wheels elevated indefinitely, as when the car is in storage. And the invention seeks, as a still further object, to provide a mechanism embodying means associated with each jack unit for effecting the selective lowering of the wheel raised by such unit and wherein said means will be conveniently operable at the exterior of the vehicle adjacent the respective wheels.

In the annexed drawings:—

Fig. 1 is a plan view showing a conventional motor vehicle chassis equipped with my improved mechanism, the wiring being illustrated diagrammatically, Fig. 2 is a rear elevation showing the rear wheels, raised, Fig. 3 is a detail elevation showing the clamps for attaching the units of the front wheels, Fig. 4 is a detail vertical section of one of the jack units, Fig. 5 is a detail sectional view showing the control valve assembly, Fig. 6 is an elevation of said assembly, Fig. 7 is a detail sectional view of one of the relief valves, Fig. 8 is a detail diagrammatic elevation of a slight variation of the invention.

Referring now more particularly to the drawings, I have shown my improved mechanism in connection with a conventional motor vehicle chassis embodying the usual frame 10. The front axle is indicated at 11 and the front wheels at 12 while the rear axle is shown at 13 and the rear wheels at 14. The engine is indicated at 15 and is equipped with the usual intake manifold 16 in which the usual engine intake suction is produced when the engine is in operation. The vehicle battery is shown at 17, while the instrument board and ammeter are diagrammatically shown at 18 and 19 respectively.

In carrying the invention into effect I employ a vacuum operated jack unit near each end of the front axle 11 and a vacuum operated jack unit near each end of the rear axle. These units are substantially identical and each includes, as particularly shown in Fig. 4, a vacuum cylinder 20 at the lower end of which is a gland 21. Bolted or otherwise removably secured to the upper end of the cylinder is a top plate 22 in which is formed a vent opening 23, and slidable in the cylinder is a piston 24, preferably equipped with expansible rings 25 to form a seal between the piston and cylinder. Rigidly fixed to the piston 24 is a piston rod 26 slidable through the gland 21 and provided at its lower end with a foot 27. Near its upper end, the rod is formed with an opening 28 and surrounding the rod within the cylinder is a volute spring 29 normally holding the piston 24 retracted in engagement with the top plate 22.

As will be perceived, suction communicated to the lower end portion of the cylinder 20 below the piston 24 will produce a partial vacuum so that, in proportion to the degree of vacuum produced, the piston will be driven downwardly with corresponding force. The question of jacking up any given car thus devolves into a problem of providing a cylinder and piston of proper diameter in relation to the weight of the car and the degree of vacuum produced in the cylinder. These factors may, of course, be readily determined. To avoid the use of a cylinder and piston of cumbersome size, however, suitable gears, as shown in Fig. 8 may be interposed between the piston rod 26 and foot 27. In this variation, the piston rod is provided with a rack 30 meshing with a large gear 31 which, in turn meshes with a small gear 32 while the foot 27 is provided with a stem 33 on which is formed a rack 34 engaged by the gear 32. In actual use, of course, a bracket or frame will be provided to support the gears and guide the racks and this frame or bracket may be secured to and depend from the cylinder or some fixed part of the vehicle. A single illustration, as just foregoing is deemed sufficient, but it is to be understood as within the purview of the present invention that if leverage is found necessary between the piston and foot, such leverage may be supplied in any appropriate and feasible way.

As shown in Fig. 3, the cylinders of the front pair of jack units are each connected to the front axle 11 by companion clamping members 35 and 36 fitting about the axle, the former being integral with its cylinder and the latter member being detachably secured by bolts 37. Similarly, the cylinders of the rear pair of jack units are each secured to the rear axle by companion clamping members 38 and 39 fitting about the axle, the former being integral with its cylinder and the latter being detachably secured by bolts 40.

In connection with the jack units, I employ a control valve assembly, shown particularly in Figs. 5 and 6 of the drawings. This assembly includes a body block 41 provided near its ends with chambers in which are rotatably mounted a pair of tapered valves 42 and 43. Overlying one side of the block is a retaining plate 44 for the valves, screwed or otherwise removably secured in position and projecting from the large ends of the valves through the plate are stems 45 carrying at their outer ends oppositely projecting cranks 46 on which are formed yokes 47. Surrounding the valve stems 45 to act on said cranks are springs 48 for returning the valves to closed position and normally holding the valves in such position. The valves are provided with transverse passages 49 and projecting from the smaller ends of the valves are stems 50 surrounding which are springs 51 acting on said stem for holding the valves seated. Formed through the side of the block 41 opposite the plate 44 is a passage 52 connecting with a longitudinal passage 53 extending from end to end of the block and intersecting the valve chambers. When the valves 42 and 43 are open the passages 49 thereof register as shown in Fig. 5, with the passage 53 while, when the valves are closed, the passages are out of register.

Connecting the passage 52 of the block 41 of the valve assembly with the intake manifold 16 of the engine 15 is a pipe 54 and extending from the forward and rear ends of the passage 53 are pipes 55 and 56 connecting with cross pipes 57 and 58, the pipe 57 entering the lower ends of the cylinders 20 of the front pair of jack units and the pipe 58 entering the lower ends of the cylinders of the rear pair of said units. Interposed in the pipes 57 and 58 near the ends thereof are two-way relief valves 59 which, as seen in Fig. 7, are adapted, when open, to connect the lower end portions of the cylinders below the pistons 24 with the atmosphere and, when closed, are adapted to establish communication through said pipes while cutting off communication with the atmosphere. Connected to the valves associated with the front pair of jack units are hand rods 60 slidably supported by brackets 61 and connected to the valves associated with the rear pair of jack units are hand rods 62 which may be slidably supported by similar brackets.

Suitably mounted adjacent the block 41 of the control valve assembly are solenoids 63 and 64 having armatures 65 engaging the yokes 47 of the valve cranks 46. The battery 17 is grounded at one side, as shown at 66 to the frame 10 of the chassis and leading from the opposite side of the battery to the ammeter 19 is a feed wire 67. A switch having bridged terminals 68 and 69 is mounted upon the instrument board 18 and connecting said terminals with the wire 67 through the ammeter is a wire 70. Mounted to cooperate with the terminals 68 and 69 are switch blades 71 and 72 from which extend wires 73 and 74, the former leading to the solenoid 63 and the latter to the solenoid 64, and grounding both solenoids to the frame 10 is a wire 75.

As will now be seen, the switch blade 71 may be closed to engage the terminal 68 when current will flow from the battery through the wire 67, wire 70, wire 73, solenoid 63 and wire 75 for energizing said solenoid. The armature 65 of this solenoid will thus be shifted for opening the control valve 42 when as will be understood in view of the foregoing description, engine suction in the intake manifold 16 of the engine 15 will be communicated through the pipes 54, 55 and 57 to the lower ends of the cylinders of the front pair of jack units. A partial vacuum will thus be formed in the lower end portions of said cylinders to effect downward movement of the pistons of said cylinders, as previously explained, so that the feet 27 of said piston will be caused to engage the ground with consequent jacking up of the front wheels 12 simultaneously. By leaving the switch blade closed, the front wheels may then be held elevated. Immediately when the switch blade is moved to open position, however, the valve 42 will be closed by its spring 48 so that the engine suction will be cut off. First one and then the other of the rods 60 of the valves 59 at the front may then be pulled forwardly for opening said valves to vent the front cylinders and lower the front wheels, when the pistons in said cylinders will be retracted by their springs 29. As the wheels descend, air will be trapped in the upper ends of the cylinders to escape more or less slowly through the vent opening 23. Thus, the wheels will be cushioned as they engage the ground while also, sudden dropping of the wheels will be prevented.

As will be understood in view of the foregoing, the rear wheels 14 may be simultaneously jacked up and selectively lowered like the front wheels or by closing both of the switch blades 71 and 72 all four wheels of the vehicle may be simultaneously jacked up. If desired, the valves 59 may be spring held in open position so as to prevent projection of the piston rods of the jack units, should either one or both of the switch blades be accidentally closed. In such instance the jack units would be controlled only by the hand rods 60 and 62 after the switch blades had been closed, assuming that it was desired to intentionally jack up the car. The openings 28 are provided to receive suitable pins therethrough, after the piston rods have been projected, for locking said rods in extended position so that the car may be jacked up indefinitely, as when in storage.

Having thus described the invention, I claim,

1. A motor vehicle jack having a piston and a cylinder, and means for operatively connecting the cylinder at one side of the piston to the motor intake to reduce pressure on said side of the piston whereby to operate the jack.

2. The combination with a motor vehicle, of a pressure operated jack for raising a part of the vehicle off the ground, said jack having a piston and a cylinder, and a conduit for establishing communication between the cylinder at one side of the piston and the motor intake to reduce pressure on said side of said piston whereby to operate the jack.

3. The combination with a motor vehicle, of a jack having a cylinder vented at the top to the atmosphere and a piston movable therein for raising a wheel of the vehicle, and a conduit establishing communication between the lower end of said cylinder and the motor intake to reduce pressure in the lower end of the cylinder whereby atmospheric pressure in the top of the cylinder against the piston operates the jack.

4. In a motor vehicle, the combination with the chassis and motor, of a pressure operated jack having a cylinder and a piston for raising a wheel of the vehicle, means for establishing operative communication between the cylinder at one side of the piston and the motor intake to reduce pressure on said side of the piston whereby to operate the jack, and electrically actuated means controlling such communication.

5. In a motor vehicle, the combination with the chassis and motor, of a pressure operated jack having a piston and a cylinder for raising a wheel of the vehicle, a conduit for operatively connecting the cylinder at one side of the piston with the motor intake to reduce pressure on said side of the piston whereby to raise the wheel, and a relief valve adjacent the cylinder operable to restore pressure on said side of the piston to effect lowering of said wheel.

6. In a motor vehicle, the combination with the chassis and motor, of a jack having a piston and a cylinder vented at one side of the piston to the atmosphere, a conduit for establishing communication between said cylinder at the opposite side of the piston and the motor intake for reducing pressure in the cylinder at the last named side of the piston to operate the jack and raise a wheel of the vehicle, means for cutting off such communication, and means for venting said cylinder at the last named side of the piston to the atmosphere to operate the jack and effect lowering of said wheel.

7. In a motor vehicle, the combination with the chassis and motor, of a pressure operated jack having a cylinder and a piston, a conduit for establishing communication between said cylinder at one side of the piston and the motor intake to reduce pressure on said side of the piston whereby to operate the jack, a spring-closed valve controlling the conduit, and electrically actuated means for opening the valve.

8. The combination with a motor vehicle, of a pressure operated jack having a cylinder secured on the vehicle and a piston for raising a wheel of the vehicle, a foot adapted to engage the ground below the vehicle, means for transmitting motion from said piston to said foot to cause the foot to be moved by the piston and in the same direction as the piston either toward or away from the ground, and means for operatively connecting the cylinder on one side of the piston with the motor intake to reduce pressure on said side of the piston whereby to operate the jack.

FRANCIS J. DONOVAN. [L. S.]